United States Patent [19]

Masuda et al.

[11] Patent Number: 4,509,958
[45] Date of Patent: Apr. 9, 1985

[54] HIGH-EFFICIENCY ELECTROSTATIC FILTER DEVICE

[75] Inventors: Senichi Masuda, 605, 40-10, Nishigahara 1-chome, Kita-ku, Tokyo; Naoki Sugita, Kawaguchi, both of Japan

[73] Assignee: Senichi Masuda, Tokyo, Japan

[21] Appl. No.: 433,414

[22] Filed: Oct. 8, 1982

[30] Foreign Application Priority Data

Oct. 12, 1981 [JP] Japan ................................ 56-162383
Dec. 28, 1981 [JP] Japan ................................ 56-214150

[51] Int. Cl.³ ............................................. B03C 3/00
[52] U.S. Cl. ........................................ 55/132; 55/138; 55/139; 55/154; 55/500; 55/521
[58] Field of Search ................ 55/138, 131, 132, 139, 55/146, 154, 155, 521, 500; 339/DIG. 3, 19

[56] References Cited

U.S. PATENT DOCUMENTS 4,227,953  10/1980  Wasielewski et al. .............. 55/500
4,357,150  11/1982  Masuda et al. ...................... 55/132

FOREIGN PATENT DOCUMENTS 2532727  2/1976  Fed. Rep. of Germany . 339/DIG. 3
37273   3/1977  Japan .................................. 55/487
892908  4/1962  United Kingdom ................ 55/132

*Primary Examiner*—Bernard Nozick
*Attorney, Agent, or Firm*—Prutzman, Kalb, Chilton & Alix

[57] ABSTRACT

A high-efficiency electrostatic air filter device having high dust collecting efficiency and a long service life is provided. The device is composed of a charging section for electrically charging the dust particles in a gas to be treated, and a dust collecting section provided with a filter medium meandering in the direction orthogonal to the direction of passage of the gas to be treated, a plurality of separator electrodes disposed in the spaces between every adjoining part of said meandering filter medium with or without the medium of insulating spacers from both upstream side and downstream side of said filter medium, and electroconductive elements provided for effectively supplying a high DC voltage between said separator electrodes.

12 Claims, 22 Drawing Figures

HIGH-EFFICIENCY ELECTROSTATIC FILTER DEVICE

BACKGROUND OF THE INVENTION (1) Field of the Invention

This invention relates to a high-efficiency electrostatic filter. More particularly, the invention relates to an electrostatic air filter device designed to be used for cleaning air in a room, which device has a high dust collecting efficiency and a long service life.

(2) Description of the Prior Art

The so-called HEPA filters are generally high in gas collecting efficiency, but they tend to suffer a high head loss when a dust-laden gas is passed therethrough.

In these filters, therefore, if the filter mesh is widened in order to reduce the head loss, there results a reduction of the duct collecting efficiency, and when it is attempted to decrease the head loss by reducing the feed gas rate, the filter size is inevitably enlarged. These filters also had the disadvantages in that the head loss increases sharply with fill-up of the filter meshes and that the service life is short. Therefore, it has been generally attempted to extend the filter life by provising a suitable pre-filter in front of the main filter.

The present inventors had previously worked out a high-efficiency electrostatic filter device having a far higher dust collecting efficiency and a longer service life than the conventional filters, said filter device comprising, as shown in FIGS. 1 and 2 of the accompanying drawings, a charging section 4 consisting of a frame 1 allowing passage of a dust-laden gas, a plurality of grounded parallel plate electrodes 2 housed and fixed in said frame 1 in parallel relation to the direction of gas flow and a plurality of discharging wires 3 provided to extend in the spaces between every adjoining plate electrodes 2 for applying a high voltage, and a dust collecting section 8 comprising a frame 5 allowing passage of the dust-laden gas which has passed the charging section 4, a filter medium 6 housed in said frame 5 and arranged meandering in the direction orthogonal to the gas flow, that is, in the direction intercepting the gas stream, and a plurality of electroconductive separator electrodes 7 allowing passage of the dust-laden gas, said separator electrodes 7 being inserted between every adjoining parts of the meandering filter medium 6 from both upstream and downstream sides of said gas flow, with a high voltage applied between the separator electrodes on the upstream side and those on the downstream side, whereby a substantial portion of the dust particles preliminarily charged in the charging section 4 are attracted to the surfaces of the respective separator electrodes on the upstream side of the dust collecting section 8, letting said dust particles lose their charges and be captured in said section 8 to thereby prevent clogging of the filter medium 6 with the dust particles to a maximal degree.

In said high-efficiency electrostatic filter device, when an electric current is supplied directly to the separator electrodes on both upstream and downstream sides, should electric discharge occur even at a part of a certain separator electrode, the charges of all of the separator electrodes move to the discharging part to increase the discharge energy with the result that there takes place temporary drop of separator voltage to cause a temporary reduction of dust collecting efficiency or even a damage to the filter medium 6 such as formation of holes in the filter medium.

Also, in said high-efficiency electrostatic filter, the spark voltage is decided by the thickness t of the filter medium 6 and the voltage applied between the separator electrodes independently of the space or distance h between the adjoining parts of the filter medium 6 gapped by the respective separator electrodes 7, 7 as shown in FIG. 3. The fact is to be also noted that when the ambient humidity or temperature is high, the filter medium 6 tends to be weakened in its electric insulation to cause an increase of leak current and/or a drop of power source voltage, resulting in a reduced dust collecting efficiency. Such tendency is conspicuous particularly when glass fiber is used as filter medium.

BRIEF SUMMARY OF THE INVENTION

An object of this invention is to provide a high-efficiency electrostatic filter device which, in the event of occurence of electric discharge at a part of a separator electrode, is capable of limiting the amount of such electric discharge and preventing the charges of all of the separator electrodes from moving to the discharging part.

Another object of this invention is to provide a high-efficiency electrostatic filter device which is minimized in leak current and increased in spark voltage even when the electric insulation resistance of the filter medium is lowered due to the high ambient temperature or humidity.

A further object of this invention is to provide a high-efficiency electrostatic filter device which is free of trouble such as break of the filter medium by the separator electrodes during manufacture of the dust collecting section.

Yet another object of this invention is to provide a high-efficiency electrostatic filter device which suffers almost no additional head loss and is minimized in rise of material cost even when the insulating spacers are further incorporated.

The nature, principle and details of the invention will become more clear from the following detailed description of the preferred embodiments of the invention with reference to the accompanying drawings.

BRIEF DESCRIPTION OF THE DRAWINGS

FIGS. 4 to 22 are the drawings illustrating the preferred embodiments of this invention, wherein FIG. 4 is a partly cut out perspective view of the device according to this invention, FIG. 5 is a perspective view showing an example of electroconductive material, FIG. 6 is a partly cut-out longitudinal sectional view of the device according to this invention, FIG. 7 is a partly cut-out cross-sectional view of the device according to this invention, FIG. 8 is an equivalent circuit diagram of the device according to this invention, FIG. 9 is an equivalent circuit diagram employed when power is supplied directly to the respective separator electrodes, FIG. 10 is a schematic illustration of the dust-laden gas streams passing the dust collecting section, FIG. 11 is a drawing illustrating the relation between the direction of electric field and the directions of movement of the electrically charged particles when they pass through the filter medium, FIG. 12 is a partial schematic view of the device of this invention where another embodiment of electroconductive material is incorporated, FIG. 13 is a partial schematic view of the device of this invention where still another embodiment of electroconductive material is incorporated, FIG. 14 is a perspective view showing a condition where the separator electrodes enveloped by insulating spacers are about to be placed in position in the spaces formed by the meandering filter medium, FIG. 15 is an electric circuit diagram of the device of this invention having a dust collecting section comprising a meandering filter medium holding therein the separator electrodes enveloped by insulating spacers, FIG. 16 is a rough sketch illustrating the positional relation among filter medium, insulating spacers and separator electrodes, FIG. 17 is a schematic illustration of the dust-laden gas streams passing the dust collecting section of FIG. 15, FIG. 18 is a drawing illustrating the relation between the direction of the electric field and the directions of movement of the electrically charged particles when they pass through the filter medium in the dust collecting section of FIG. 15, FIG. 19 illustrates an example where insulating spacers are provided on both sides of the filter medium, FIG. 20 illustrates the example where insulating spacers are provided on one side of the filter medium, FIG. 21 shows another embodiment of insulating spacer, and FIG. 22 shows still another embodiment of insulating spacer.

DETAILED DESCRIPTION OF THE INVENTION

The invention will be described in further detail hereinbelow by way of the embodiments thereof while having reference to the accompanying drawings.

Figure 1:
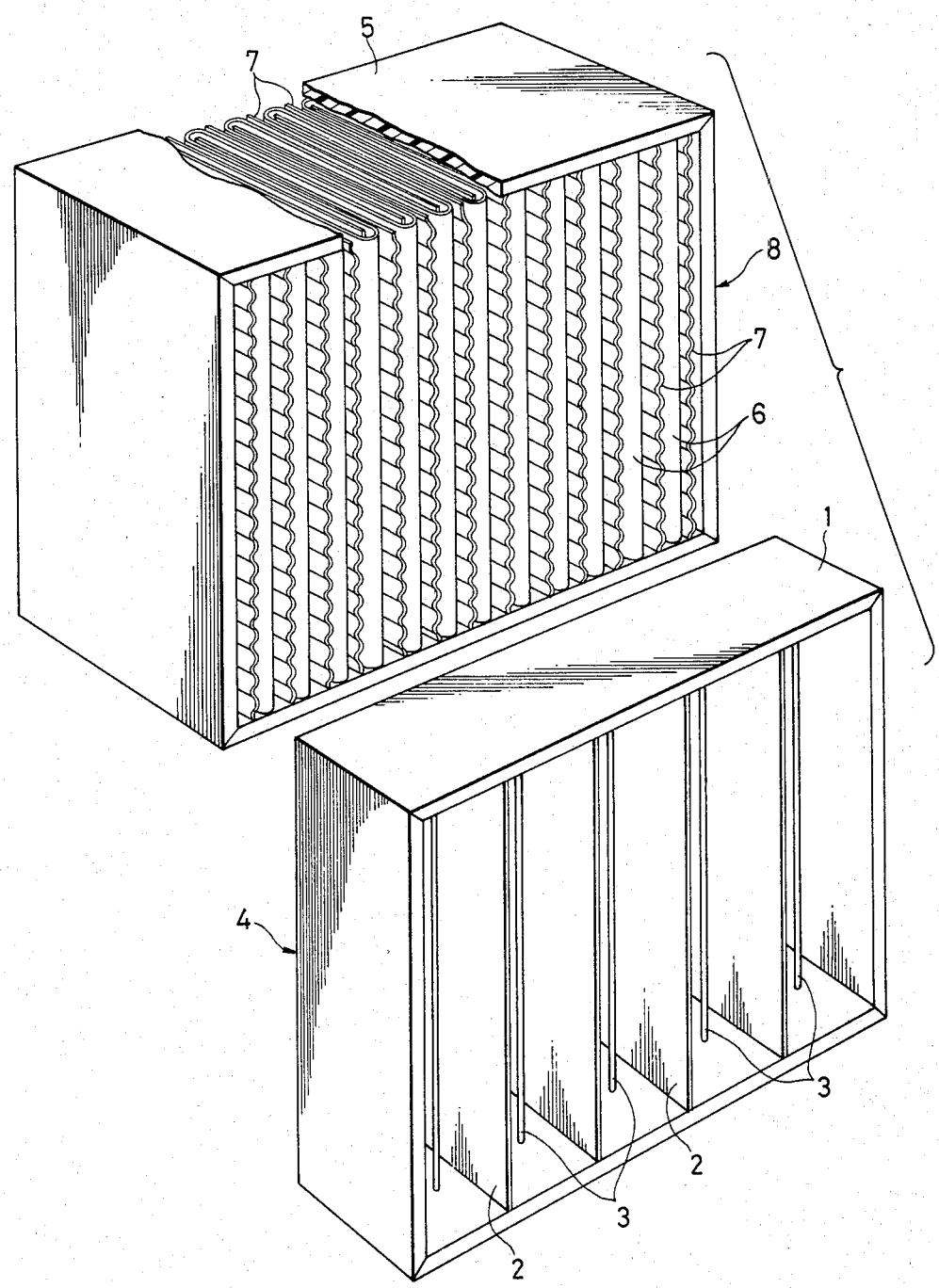
FIG. 1 is a schematic perspective view of a conventional high-efficiency electrostatic filter device.
Figure 2:
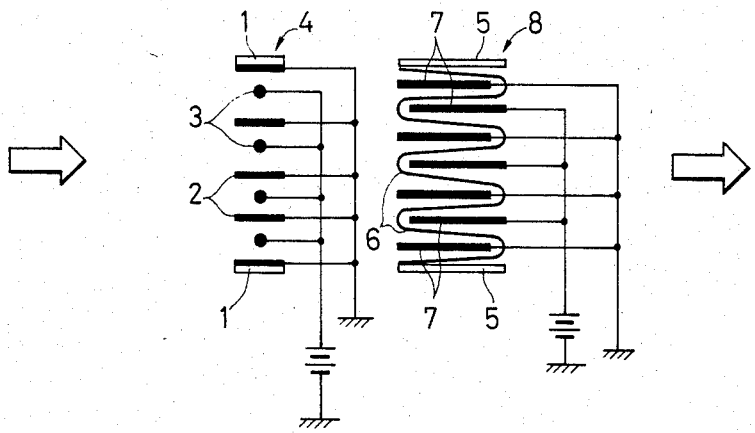
FIG. 2 is an electric circuit diagram of said filter device.
Figure 3:
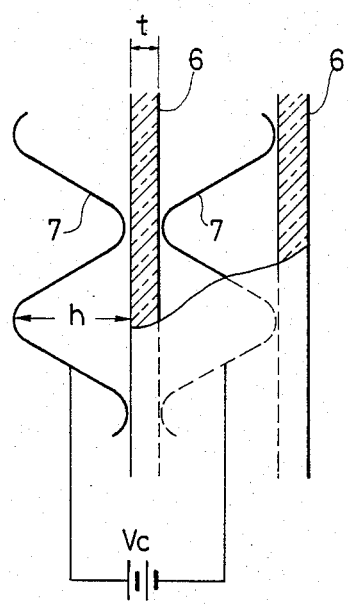
FIG. 3 is a rough sketch illustrating the positional relation between the filter medium and separator electrodes in said filter device.
Figure 4:
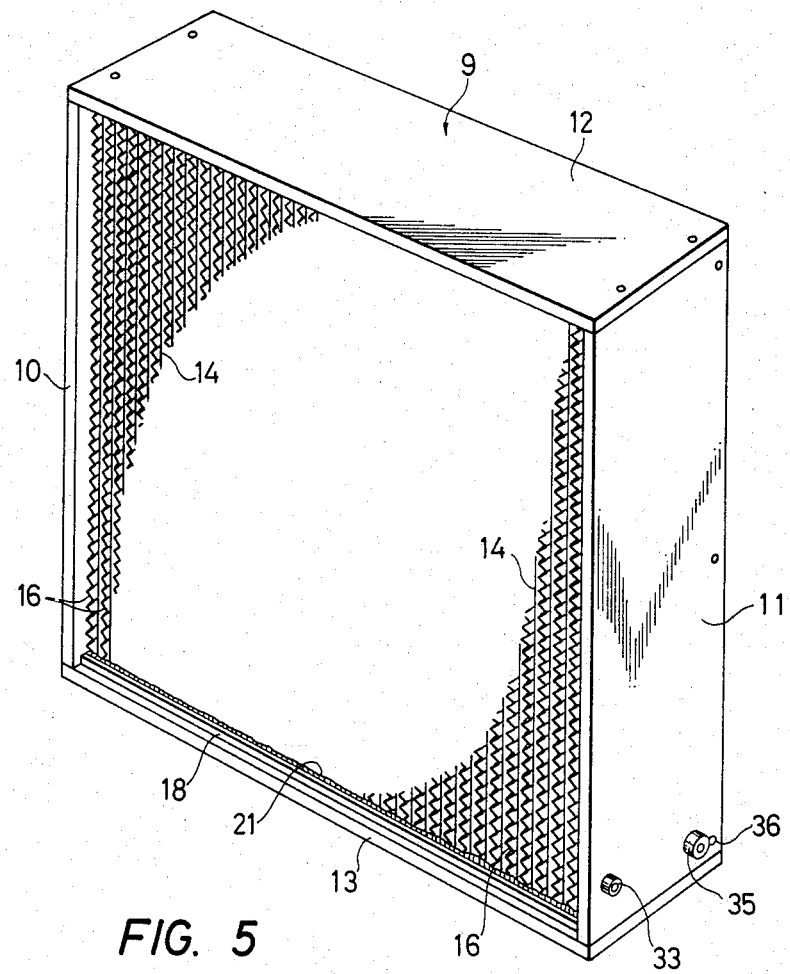
Figure 5:
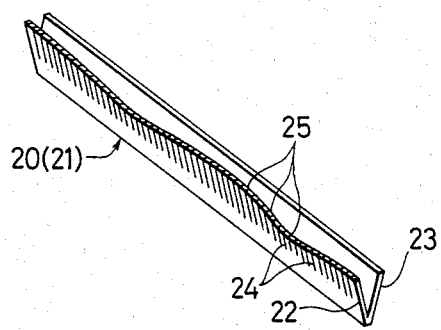
Figure 6:
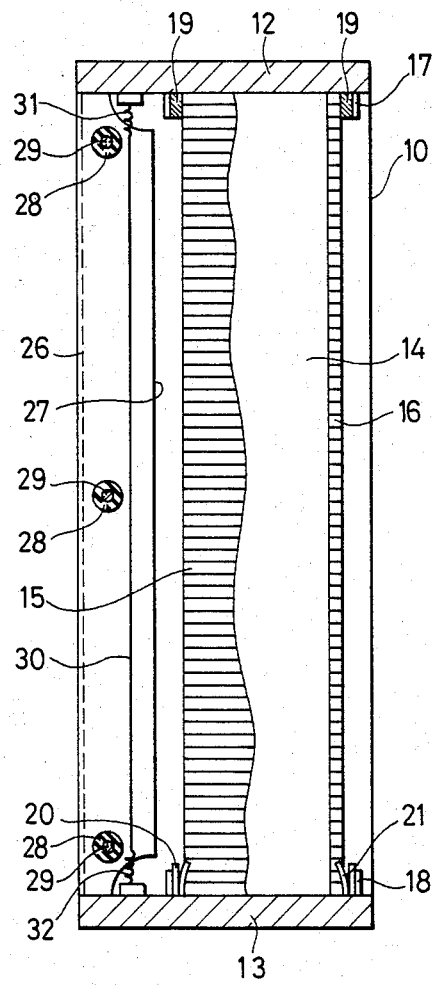
Figure 7:
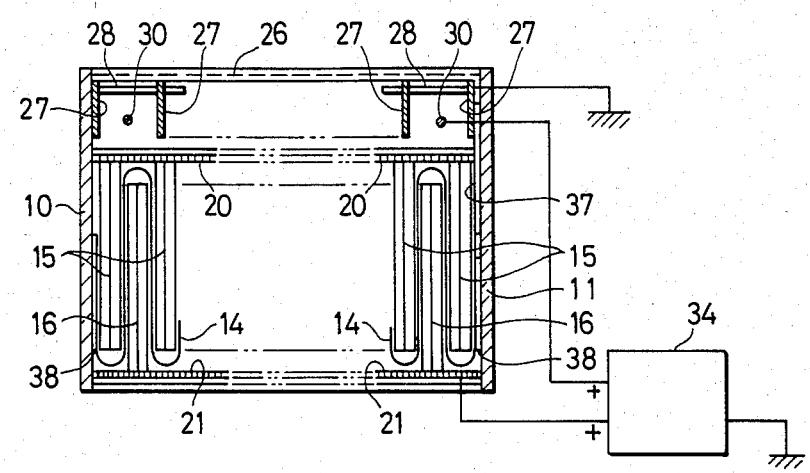

Referring to FIGS. 4 to 11, numeral 9 indicates a device frame designed to allow passage of dust-laden gases, said frame 9 consisting of both side walls 10, 11, a top plate 12 and a bottom plate 13. Numeral 14 refers to a filter medium made from glass fiber or other material. This filter medium 14 is so disposed in the inside of the frame 9 that it extends meandering from one side wall 10 to the other side wall 11, that is, in the direction orthogonal to the direction of the dust-laden gas stream, and that the upper and lower ends thereof reach the inside of the top plate 12 and the inside of the bottom plate 13, respectively. Numerals 15 and 16 denote the separator electrodes fitted in between the adjoining portions of the meandering filter medium 14 from the upstream side and the downstream side, respectively, of the dust-laden gas passing the frame 9. These separator electrodes are made of an electroductive material such as aluminum foil and adapted to support the adjoining portions of the filter medium 14 so that they are spaced-apart constantly from each other. Each of said separator electrodes is also bent in corrugate form successively from its upper end to its lower end. The top end portions of said filter medium 14 and separator electrodes 15, 16 are flanked by the walls 17 projecting from the innerside of the top plate 12. The lower end portions of said filter medium 14 and separator electrodes 15, 16 are also similarly flanked by the walls 18 projecting from the innerside of the bottom plate 13. A sealant is cast into the inside of these flanking walls 17, 18 and solidified to join the upper and lower end faces of said filter medium 14 and separator electrodes 15, 16 airtightly to the top plate 12 and bottom plate 13, respectively. Numerals 20, 21 are electroconductive rubber sheets which are inserted into the spaces formed between the upstream side separator electrodes 15 and flanking wall 18 and between the downstream side separator electrodes 16 and flanking wall 18 before casting the sealant and are fixed in position by casting and solidifying the sealant 9. Each of said electroconductive rubber sheets, as shown in FIG. 5, comprises an elongated sheet of rubber which has been bent in V shape along the center line thereof and is so disposed that the edges of the two bent portions 22, 23 stay open normally. In the portion 22 to be opposed to the separator electrodes 15, 16 are provided a plurality of cuts 24 from the edge to form a plurality of small contact pieces 25 each of which is pressed against the corresponding one of said separator electrodes 15, 16. Numeral 26 represents a porous cover such as a metal gauze adapted to cover the inlet of the frame 9, and numeral 27 indicates the grounded parallel plate electrodes provided between said porous cover 26 and filter medium 14 in the inside of the frame 9, said plate electrodes 27 being arranged parallel to each other in the same direction as the dust-laden gas stream. Numeral 28 refers to the cylindrical electroconductive spacers adapted to hold said plate electrodes 27 in a spaced-apart relation while providing an electrical connection between said electrodes 27. These spacers are supported by the respective pivots passed through the three locations, a top part, a middle part and a lower part, of each said electrode 27. Numeral 30 indicates the ionizing wires provided one for each electrode 27 at the same intervals as said electrodes 27, each of said ionizing wires 30 being disposed taut between the top plate 12 and the bottom plate 13 through the medium of springs 31, 32. Numeral 33 is a connecting terminal for applying a high voltage of a high voltage power source 34 to the electroconductive rubber sheet 21, and 35 is another connecting terminal for applying a high voltage of said power source 34 to the ionizing wires 30, and 36 is an earth terminal electrically connected to an aluminum foil 37 which is in contact in common to the upstream side separator electrodes 15, electroconductive rubber sheet 20 and electrodes 27 all of which contact the innerside of the side wall 11 of the frame 9. Numeral 38 is a sealant provided for joining the downstream side end faces of the filter medium 14 airtightly to both side walls 10, 11 of the frame 9. This sealant can act as a seal for preventing generation of powdery dust from the inside of both side walls 10, 11 on the downstream side thereof in case said both side walls 10, 11 are made of a material, such as wood, which has the possibility of producing powdery dust.

Figure 8:
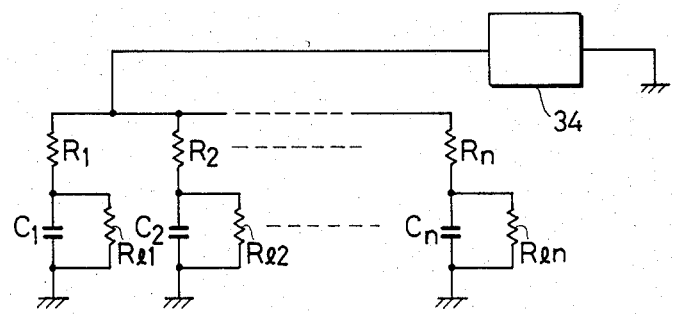

In the dust collecting section comprising said filter medium 14 and separator electrodes 15, 16 of said arrangements, capacitors are formed between the upstream side separator electrodes 15 and downstream side separator electrodes 16 and a high voltage is applied through said electric resistances of the electroconductive rubber sheets 20, 21, with a slight leak current flowing through the filter medium 14, so that if the electrostatic capacities between the respective separator electrodes are given as $C_1, C_2, \ldots C_n$, the resistances of the electroconductive rubber sheets 20, 21 as $R_1, R_2, \ldots R_n$, and the resistances of the filter medium 14 as $R1_1, R1_2, \ldots R1_n$, then the equivalent circuit of said dust collecting section can be depicted as in FIG. 8.

Figure 9:
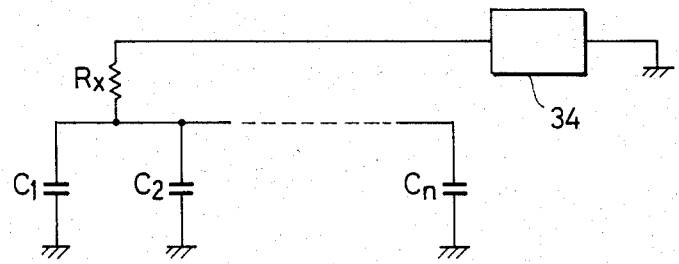
Figure 10:
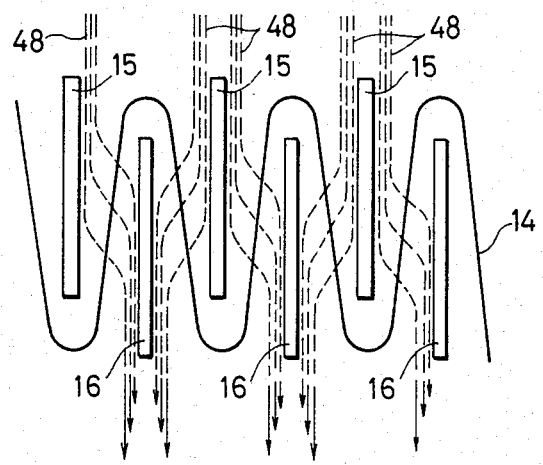

In case power is supplied directly to the respective separator electrodes 15, 16 with no medium of the electroconductive rubber sheets 20, 21, the equivalent circuit can be represented as illustrated in FIG. 9, but in this case, should electric discharge occur even at a part of a certain separator electrode, all the charges of the separator electrodes 15, 16 are urged to move instantaneously to the discharging part to increase the discharge energy. The discharge energy at this time can be given substantially as follows:

$$E_1 = \frac{1}{2} (C_1 + C_2 + \ldots + C_n) V^2$$

This discharge energy is decided by the electrostatic capacity and the voltage applied between the separator electrodes 15, 16 and not affected by the resistance Rx connected to the outside.

However, in case the separator electrodes 15, 16 are arranged separately from each other and power is supplied severally thereto through the respective resistances $R_1-R_n$, even if discharge occurs at a part of a certain separator electrode, the amount of discharge is restricted by the resistances $R_1-R_n$ and the charges loaded between the separator electrodes don't move to the discharging part, so that, in this case, the discharge energy is about one nth of that created when no mediation of resistances $R_1-R_n$ is provided. Thus, the discharge energy in this case is given as:

$$E_2 = \frac{1}{2} CnV^2 = \frac{E_1}{n}$$

According to the experiments conducted under the following conditions: external dimensions of the frame 9: 610 mm × 610 mm × 150 mm; power source voltage: 1 KV; filter medium leak resistance: 200 MΩ; filter medium leak current: 5 μA per one stage of separator electrode; and electrostatic capacity between separator electrodes: $3 \times 10^{-8}$ F, it is found that the effect of restricting the amount of discharge manifests itself when the value of resistance Rn reaches 10 KΩ or higher although this depends on the electrostatic capacity between the separator electrodes, and the higher the resistance, the less is movement of the charges between the separator electrodes. However, if the value of resistance Rn is set too high, there takes place a voltage drop at both ends of the resistance Rn due to leak current, causing a substantial decrease of the voltage applied between the separator electrodes to reduce the dust collecting efficiency. As a practical case, supposing that a 5% voltage drop is tolerated for 1 KV of power source voltage, since leak current is 5 μA per one stage of separator electrode as said above, the resistance Rn is given as:

$$\frac{1000 \times 0.05}{5 \times 10^{-6}} = 10^7 \, (\Omega)$$

In other words, that portion of the resistance Rn which corresponds to the voltage drop can be neglected if it is less than 10 MΩ.

Therefore, in the case of the above-said experimental example, it is appropriate to set the resistance Rn within the range of 10 KΩ to 10 MΩ.

The operation of the above-described high-efficiency electrostatic filter device will now be discussed.

Figure 11:
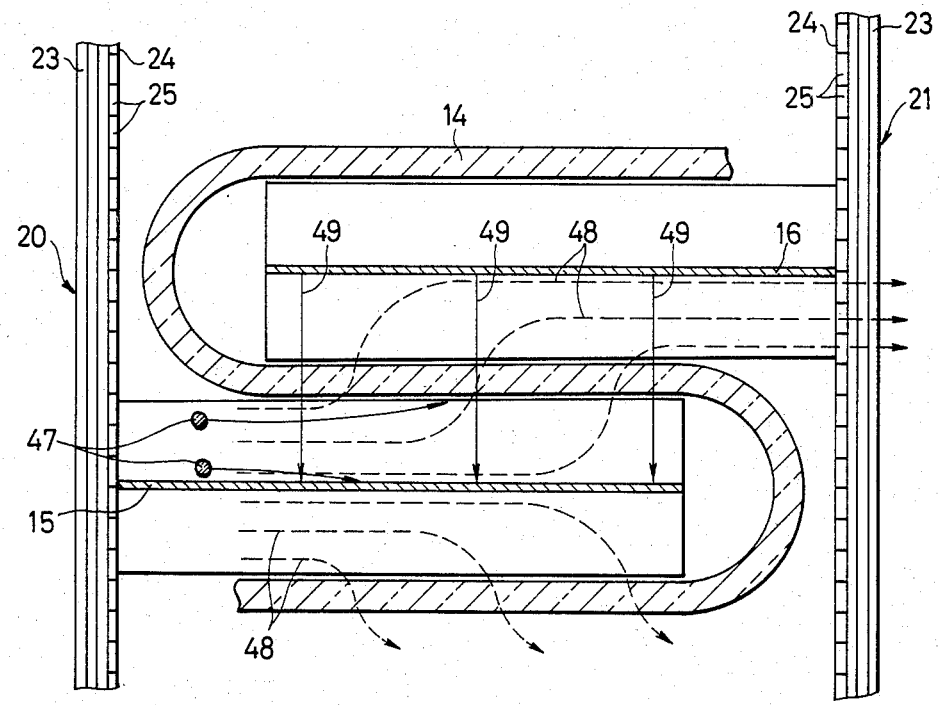

A high DC voltage is applied to the ionizing wires 30 and spacer electrodes 28, and under this condition, a dust-laden gas is supplied from the inlet of the frame 9. The dust particles 47 are electrically charged by corona discharge while passing the charging section consisting of the grounded parallel plate electrodes 27 and ionizing wires 30, and the gas carrying the charged dust particles 47 passes through the dust collecting section as indicated by the dash line arrows in FIGS. 10 and 11. In this process, most of the charged particles 47 are attracted to the separator electrodes 15 on the upstream side and deposited on the surfaces of said separator electrodes 15. In this way, most of the dust particles in the gas treated are removed. The larger the particle size, the greater is this dust removing effect. The gas streams 48 containing the remaining charged particles 47 further advance to pass across the filter medium 14 along the shortest path because of extremely high head loss of the filter medium 14. Therefore, as shown in FIG. 11, the gas streams 48 move substantially parallel but opposite to the lines of electric force 49 which are directed from the separator electrode 16 to the separator electrode 15. At the same time, the velocity of the gas streams 48 through the filter medium 14 is extremely reduced as compared with the velocity (per unit cross-sectional area) of the gas streams upstream of the dust collecting section. Thus, when the direction of the electric field becomes opposite to the direction of the gas streams, the velocity of electric movement of the charged particles 47, that is, the velocity of their movement in the direction of the lines of electric force 49 becomes greater than the velocity of the gas streams 48 passing through the filter medium 14, so that the charged particles 47 can not enter inside of the filter medium 14. However, since the gas stream velocity outside the filter medium 14 is high, the charged particles 47 are forced to ultimately settle down in a porous state on the surface of the filter medium 14. Those charged particles 47 which did not deposit in a porous state but got into the filter medium 14 keep on moving along the lines of electric force converged to the fibers of the filter medium 14 by the electric field applied between the separator electrodes 15, 16, so that the amount of dust caught by the fibers increases rapidly.

With this dust collecting mechanism, the dust collecting efficiency is phenomenally improved and clean gas is discharged out from the outlet of the frame 9. Further, since the charged particles of greater sizes have a larger tendency of being collected on the separator electrodes 15, the clogging of the filter medium is minimized to markedly extend its service life.

In the above-described embodiment where a rubber sheet provided with a plurality of cut pieces 25 is used for the electroconductive rubber sheets 20, 21, there is an advantage that there is produced no part of contact failure or improper contact because each of the individual cut pieces 25 is pressed against corresponding one of the separator electrodes even when the separator electrodes 15 on the unstream side or the separator electrodes 16 on the downstream side are set in position with certain irregularity in arrangement, but in this invention, where it is assured that the separator electrodes on the upstream side or those on the downstream side are held in position with perfect alignment, it is possible to use an electroconductive rubber sheet which is not provided with separate cut pieces but is merely bent in V shape.

Figure 12:
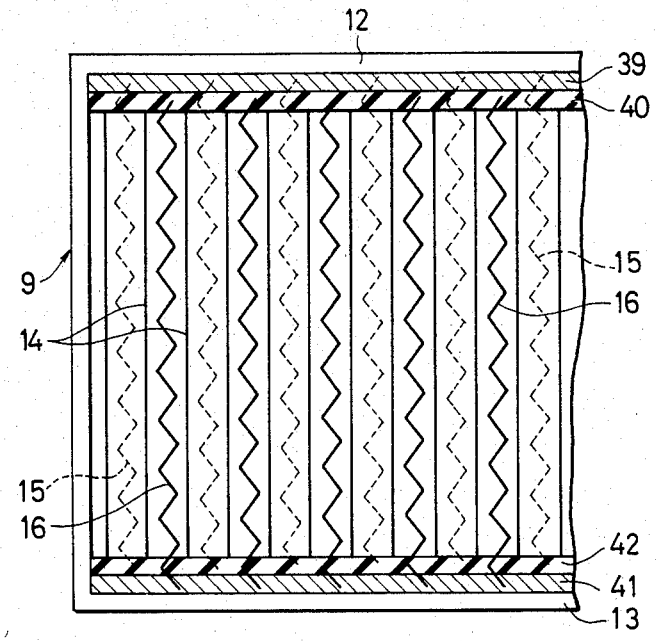

The present invention is not limited in its construction to the above-described embodiment; it is possible to incorporate an arrangement in which, as shown in FIG. 12, two seal layers, that is, an electroconductive seal layer 39 having an electric resistance for preventing movement of the charges of the separator electrodes 15, 16 and an insulator seal layer 40, are provided on the innerside of the top plate 12 of the frame 9 while providing two similar layers 41 and 42 on the innerside of the bottom plate 13 so that each of the electroconductive separator electrodes 15 fitted in the meandering filter medium 14 from the upstream side of the gas stream is embedded at its upper end in the electroconductive seal layer 39 and at its lower end in the insulator seal layer 42 while each of the electroconductive separator electrodes 16 fitted in said filter medium from the downstream side of the gas stream is embedded at its lower end in the electroconductive seal layer 41 and at its upper end in the insulator seal layer 40, with each of the upstream side separator electrodes 15 being electrically connected to one of the electroconductive seals alone while each of the downstream side separator electrodes 16 being electrically connected to the other electroconductive seal alone, and wherein a high negative or positive voltage is applied to the upstream side separator electrodes 15 while applying a high positive or negative voltage to the downstream side separator electrodes.

In this case, since an electroconductive liquid sealant is cast into the edges of the separator electrodes 15, 16 and solidified, power feed can be made positively without affected by the edge shape of the separator electrodes 15, 16 and the mechanism is high in reliability.

Figure 13:
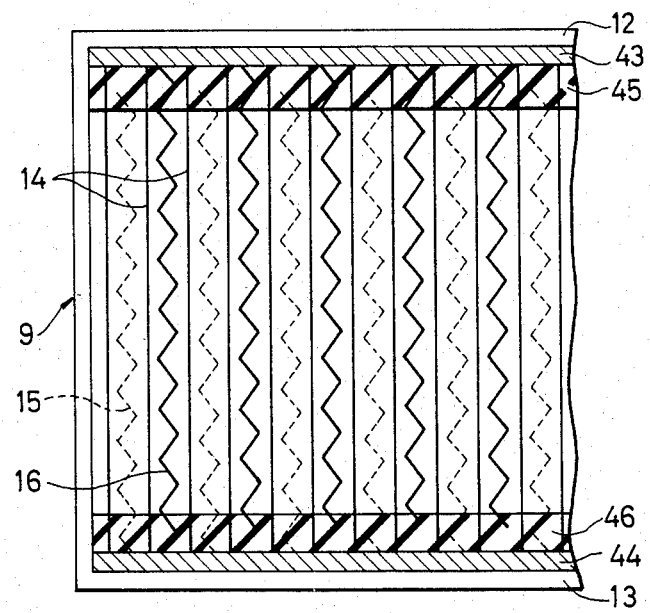

In still another embodiment shown in FIG. 13, rubber sheets 43, 44 having an electric resistance for preventing charge movement are bonded to the inner sides of the top plate 12 and the bottom plate 13, respectively, of the frame 9, and a contact piece formed at the upper end of each of the electroconductive separator electrodes 15 fitted in the meandering filter medium 14 from the upstream side of the gas stream is resiliently contacted with the rubber sheet 43 while a contact piece formed at the lower end of each of the electroconductive separator electrodes 16 fitted from the downstream side of the gas stream is resiliently contacted with the rubber sheet 44. A high negative or positive voltage is applied to the separator electrodes 15 on the upstream side while a high positive or negative voltage is applied to the separator electrodes 16 on the downstream side. In FIG. 13, numerals 45 and 46 indicate a sealant for binding both upper and lower ends of the filter medium 14 and separator electrodes 15, 16 airtightly to the top plate 12 and the bottom plate 13, respectively.

In this case, contact with high reliability is provided since the respective contact pieces and the corresponding electroconductive rubber sheets are contacted with each other under a pertinent pressure.

In the above embodiment, both charging section and dust collecting section are provided in an integrally molded frame, but said both sections may be provided in the separate frames which are joined together later.

In the foregoing embodiment, a high-voltage power source can be connected to both upstream side and downstream side separator electrodes fitted in the meandering filter medium through an electroconductive material having an electric resistance for preventing movement of the charges on said separator electrodes, so that in case electric discharge occurs at a part of a certain separator electrode, the amount of such discharge is restricted by said electric resistance and it is possible to prevent the charges of all of the separator electrodes from moving to the discharging part, thereby minimizing the discharge energy. Therefore, it never occurs that the separator electrode voltage be dropped temporarily due to electric discharge, thus eliminating any likelihood of the dust collecting efficiency being lowered temporarily during operation. Also, there is no fear of causing damage to the filter medium such as formation of holes in the filter medium.

Figure 14:
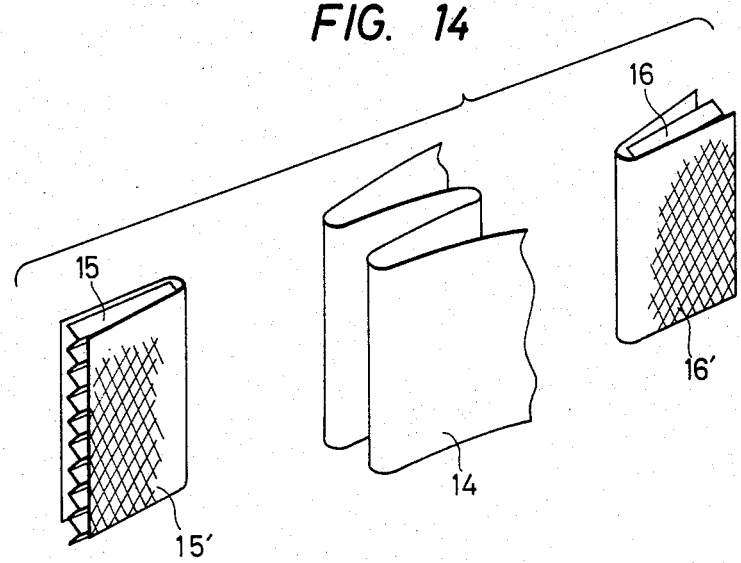

In the hereinabove described embodiment, the separator electrodes 15, 16 are inserted directly into the spaces formed by the meandering filter medium from both upstream side and downstream side, but the present invention embraces incorporation of insulating spacers between the filter medium and the upstream side separator electrodes and/or between the filter medium and the downstream side separator electrodes. This embodiment is discussed below by referring to FIGS. 14 to 22 of the accompanying drawings. In the drawings, numeral 15' indicates the insulating spacers placed between the filter medium 14 and the upstream side separator electrodes 15, and numeral 16' denotes the insulating spacers interposed between the filter medium 14 and the downstream side separator electrodes 16. Each of these spacers 15', 16' may be, for example, a polyethylene-made gauze folded in two so that a separator electrode is held therein as shown in FIG. 14.

Figure 15:
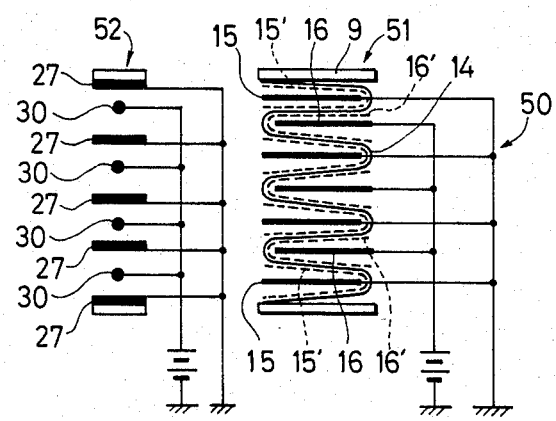

The filter medium 14 having properly fitted therein the separator electrodes 15, 16 through respective gauges 15', 16' is housed in position in the frame 9 as shown in FIG. 15, and a high DC voltage is applied to the downstream side separator electrodes 16 while the upstream side separator electrodes 15 are connected to a grounded electric circuit 50 to constitute the dust collecting section 51. Designated generally by numeral 52 is the charging section comprising the grounded parallel plate electrodes 27 and ionizing wires 30 and so arranged that the dust-laden gas which has passed this charging section 52 will enter the dust collecting section 51.

Figure 16:
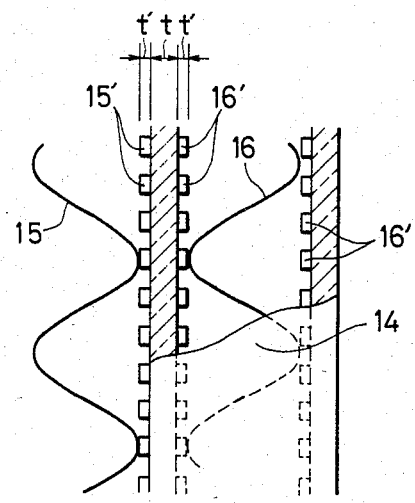
Figure 17:
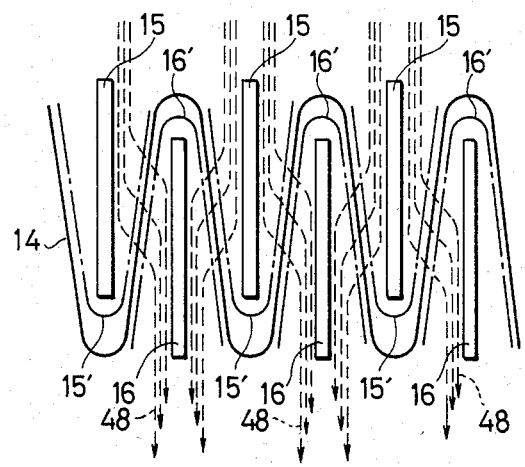
Figure 18:
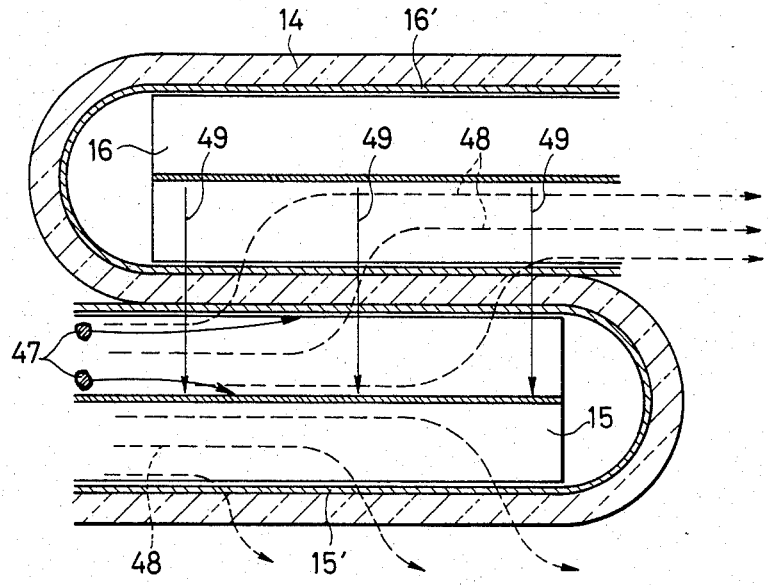

In the filter device of this construction, gaps are formed between the filter medium 14 and the separator electrodes 15, 16 by virtue of the spacers 15', 16' as shown in FIG. 16, allowing avoidance of direct contact of the separator electrodes 15, 16 with the filter medium 14. In this case, the spark voltage is decided by the sum of the thickness $t$ of the filter medium 14 and the thicknesses $t'$ of both spacers 15' and 16' ($t+t'+t'$) and the high voltage Vc applied across the separator electrodes 15, 16.

In operation of the electrostatic filter device of this embodiment, a high DC voltage is applied to the ionizing wires 30 in the charging section 52 and the separator electrodes 16 in the dust collecting section 51 and, under this condition, a dust-laden gas is fed into the device. The dust particles 47 are electrically charged by corona discharge while passing through the charging section constituted by the grounded parallel plate electrodes 27 and ionizing wires 30, and the gas carrying the charged particles 47 passes through the dust collecting section 51 as indicated by the dash line arrows in FIGS. 17 and 18. In this process, dust is collected by the same dust collecting mechanism as explained in relation to the embodiment of FIG. 11.

Figure 19:
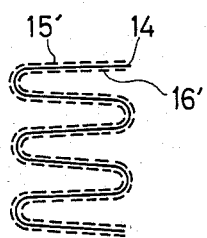
Figure 20:
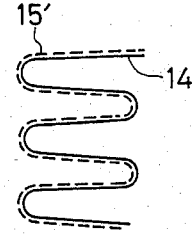

In the foregoing embodiment, both groups of separator electrodes 15, 16 are wrapped by the twofold gauzes 15', 16', but only one group of them, that is, either separator electrodes 15 or separator electrodes 16 may be wrapped by the gauzes. Also, the gauzes 15', 16' may not necessarily be so designed as to wrap separator electrodes 15, 16 individually; they may be so arranged as to extend meandering along both sides of the meandering filter medium 14 as shown in FIG. 19 or along one side of the meandering filter medium 14 as shown in FIG. 20 such that the gauzes are positioned between the filter medium 14 and the separator electrodes 15, 16. Further, while polyethylene gauzes are used as insulating spacers in the above-described embodiment, it is possible to use the gauzes or nets made of various other types of insulating materials or to use gas-permeable materials, and in this case, the size of meshes or pores may be suitably selected from within the range which allows passage of the dust-laden gas to be treated.

Figure 21:
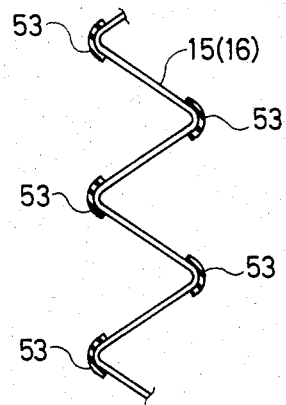
Figure 22:
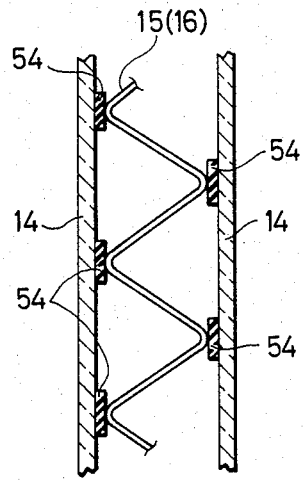

It is also within the scope of this invention to bond or otherwise apply an insulating material at the crests of the corrugate separator electrodes 15, 16 to form the insulating layers 53 as shown in FIG. 21, or to bond or otherwise apply an insulating material only at those parts of the filter medium surface where the crests of the separator electrodes 15, 16 contact to thereby form the insulating layers 54 as shown in FIG. 22. Since these insulating layers 53 or 54 cover the crest portions of the separator electrodes where the electric field converges, there is provided a very high spark voltage. Also, since the separator electrodes are not directly contacted with the filter medium owing to said insulating layers, there is no fear that their insulating performance be deteriorated under the influence of ambient temperature or moisture.

Thus, in the just described embodiment, direct contact between the filter medium and both or one of the separator electrodes 15, 16 is avoided and the spark voltage is decided by the sum of the thickness of the filter medium and the thickness of the insulating spacers and the high voltage applied across the separator electrodes, so that even if the electric insulation resistance of the filter medium is lowered due to high ambient temperature or humidity, the leak current is minimized and there takes place no drop of power source voltage. Rather, the spark voltage is elevated to allow application of a higher voltage across the separator electrodes, providing an increased dust collecting efficiency. Also, the safety factor in application of a high voltage between the separator electrodes is increased, and the device can be used with no fear of influence by the environmetal conditions such as temperature, humidity, etc., at the site of installation. Further, in case the electroconductive separator electrodes are covered with a gauze or such, there is eliminated any risk of the separator electrodes breaking through the filter medium, which might cause short-circuiting as a result of partial contact of the upstream side and downstream side separator electrodes, during manufacture of the dust collecting section. Incorporation of the spacers such as gauzes leads to no significant rise of head loss, and since an uncostly material can be used for such spacers in comparison with the filter material, the resulting rise of the material cost is of a small extent.

What is claimed is:

1. A high-efficiency electrostatic filter device comprising a charging section where the dust particles in a dust-laden gas passed therethrough are electrically charged by corona discharge, and a dust collecting section comprising a filter medium arranged meandering in the direction orthogonal to the direction of flow of the dust-laden gas emerging from said charging section and a first set of a plurality of upstream generally parallel separator electrodes on the upstream side of the filter medium and a second set of a plurality of downstream generally parallel separator electrodes on the downstream side of the filter medium, the upstream and downstream separator electrodes being arranged to allow passage of the dust-laden gas in the spaces between every adjoining parts of said meandering filter medium from both the upstream side and the downstream side of said gas stream, first and second elongated electroconductive resistance elements electrically connecting the first and second sets of separator electrodes respectively, each said elongated resistance element being in contact with and electrically connecting the separator electrodes of the respective set of electrodes with electrical resistance between separator electrodes, a high voltage power source applied between said upstream separator electrodes and downstream separator electrodes via the electroconductive resistance elements, the electroconductive resistance elements having said electrical resistance between separator electrodes for preventing dissipation of the separator electrode charges by resisting movement of charges between said separator electrodes upon the occurrence of an electric discharge from one of the separator electrodes.

2. The high-efficiency electrostatic filter device according to claim 1, wherein each of said electroconductive resistance elements is made of an electroconductive rubber sheet having an electric resistance for preventing movement of the charges between the separator electrodes and is elongated and has a transverse V-shape forming an elongated edge engaging each of the respective set of separator electrodes for electrical connection thereof.

3. The high-efficiency electrostatic filter device according to claim 1, wherein each said electroconductive element is composed of one electroconductive seal formed by casting a liquid electroconductive sealant, which has an electric resistance for preventing movement of the charges of the separator electrodes, in between the frame of the device and the end of the meandering filter medium and the ends of the upstream side separator electrodes held in said filter medium and solidifying said sealant, and another electroconductive seal formed by casting said liquid electroconductive sealant in between said frame and the end of the meandering filter medium and the ends of the downstream side separator electrodes held in said filter medium and solidifying said sealant.

4. The high-efficiency electrostatic filter device according to claim 3, wherein one of said electroconductive seals is provided on one of the opposing wall surfaces of the frame and the other electroconductive seal is provided on the other of said opposing wall surfaces of the frame.

5. The high-efficiency electrostatic filter device according to claim 1, where each said electroconductive element is composed of one electroconductive sheet having an electric resistance for preventing movement of the charges of the separator electrodes and so arranged that it is elastically contacted with the ends of the upstream side separator electrodes held in the meandering filter medium and another electroconductive sheet so arranged that it is elastically contacted with the ends of the downstream side separator electrodes held in the meandering filter medium.

6. The high-efficiency electrostatic filter device according to claim 5, wherein one of the electroconductive sheets is provided on one of the opposing wall surfaces of the frame and the other electroconductive sheet is provided on the other of said opposing wall surfaces of the frame.

7. The high-efficiency electrostatic filter device according to claim 1, wherein an individual and separate gas-permeable insulating spacer of nonconductive material is interposed between the filter medium and each separator electrode of at least one of said sets of separator electrodes.

8. The high-efficiency electrostatic filter device according to claim 7, wherein said spacers are made of plastic or other insulating material.

9. The high-efficiency electrostatic filter device according to claim 7, wherein the separator electrodes have a corrugated shape and wherein the insulating spacers are interposed between the filter medium and the crests of the separator electrode corrugations.

10. The high-efficiency electrostatic filter device according to claim 7, wherein the separator electrodes have a corrugated shape and wherein the insulating spacers are layers interposed between the filter medium surface and the crests of the separator electrode corrugations.

11. The high-efficiency electrostatic filter device according to claim 7, wherein said spacers are insulating gauzes arranged on at least one side of the meandering filter medium.

12. A high-efficiency electrostatic filter device comprising a charging section where the dust particles in a dust-laden gas passed therethrough are electrically charged by corona discharge, and a dust collecting section consisting of a filter medium arranged meandering in the direction orthogonal to the direction of flow of the dust-laden gas emerging from said charging section and a plurality of upstream separator electrodes and a plurality of downstream separator electrodes designed to allow passage of the dust-laden gas and arranged in the spaces between every adjoining parts of said meandering filter medium from both upstream side and downstream side of said gas stream, first and second electroconductive elements connecting the plurality of upstream separator electrodes and plurality of downstream separator electrodes respectively, a high voltage power source applied between said upstream side separator electrodes and downstream side separator electrodes via the electroconductive elements, wherein the electroconductive elements have an electric resistance for preventing movement of the charges of said separator electrodes and are provided in contact with said upstream side and downstream side separator electrodes respectively, wherein said electroconductive elements are each made of an electroconductive rubber sheet having an electric resistance for preventing movement of the charges of the separator electrodes, said rubber sheet being bent in V shape, with one bent portion thereof being provided with an plurality of cuts from the edge thereof to form a plurality of small contact pieces contacting the respective separator electrodes for electrical connection thereof.

* * * * *